US009150205B1

(12) United States Patent
Wright

(10) Patent No.: US 9,150,205 B1
(45) Date of Patent: Oct. 6, 2015

(54) HYDRAULIC BRAKE SYSTEM FOR MECHANICALLY BRAKED MOTOR VEHICLES

(71) Applicant: David W. Wright, Hardwick, MA (US)

(72) Inventor: David W. Wright, Hardwick, MA (US)

( * ) Notice: Subject to any disclaimer, the term of this patent is extended or adjusted under 35 U.S.C. 154(b) by 0 days.

(21) Appl. No.: 14/136,246

(22) Filed: Dec. 20, 2013

Related U.S. Application Data

(60) Provisional application No. 61/740,544, filed on Dec. 21, 2012.

(51) Int. Cl.
*B60T 11/00* (2006.01)
*B60T 11/10* (2006.01)

(52) U.S. Cl.
CPC .................................... *B60T 11/102* (2013.01)

(58) Field of Classification Search
CPC ......... B60T 8/26; B60T 11/10; B60T 11/102; B60T 11/103; B60K 2741/20; B66D 5/026
USPC .......................... 188/349, 10, 106 P, 152, 361
See application file for complete search history.

(56) References Cited

U.S. PATENT DOCUMENTS

| | | | | |
|---|---|---|---|---|
| 1,210,846 A | * | 1/1917 | Royce | 188/151 R |
| 1,249,143 A | * | 12/1917 | Loughead | 188/361 |
| 1,603,668 A | * | 10/1926 | Duesenberg | 188/152 |
| 2,154,636 A | * | 4/1939 | Nickell | 188/106 P |
| 2,155,030 A | * | 4/1939 | Wilkins | 188/106 P |
| 2,181,161 A | * | 11/1939 | Wolf | 188/10 |
| 2,235,412 A | * | 3/1941 | Weiss et al. | 477/196 |

OTHER PUBLICATIONS

A footnote to automotive Brake History, Bert A. Linderman, Stutz and the Timken Hydrostatic Brake by Bill Deibel; Antique Automobile, Sep./Oct. 2011; reprinted with permission from the CCCA Pacific Northwest Region Bumper Guardian.

* cited by examiner

*Primary Examiner* — Pamela Rodriguez
(74) *Attorney, Agent, or Firm* — Brian M. Dingman; Dingman, McInnes + McLane, LLP

(57) ABSTRACT

An hydraulic based system for mechanically braked motor vehicles of the type that move brake rods with two ends, the distal end mechanically coupled to a motor vehicle braking device at the wheel of the motor vehicle and the proximal end mechanically coupled to a mechanical brake system structure of the motor vehicle. The system includes a hydraulic cylinder inserted into or at an end of each of the brake rods, to translate motion of the mechanical brake system structure to hydraulic force that then moves the distal portion of the brake rod located between the cylinder and the braking device, and a hydraulic fluid distribution system fluidly interconnecting all of the cylinders.

6 Claims, 2 Drawing Sheets

HYDRAULIC BRAKE SYSTEM FOR MECHANICALLY BRAKED MOTOR VEHICLES

CROSS-REFERENCE TO RELATED APPLICATION

This application claims priority of Provisional Patent Application Ser. No. 61/562,726 filed on Dec. 21, 2012.

BACKGROUND

There are two inherent problems with mechanical brakes on automobiles and other motor vehicles that are addressed herein. First, it is nearly impossible to maintain an equal adjustment at each of the four wheels. This results in one wheel locking before the rest, causing the vehicle to skid erratically. The second problem is that the brakes apply equal force to both the front and rear wheels. It is well understood that most of the braking force should be applied to the front wheels.

SUMMARY

This disclosure features a hydraulic-based system for mechanically-braked motor vehicles of the type that move brake rods with two ends, the distal end mechanically coupled to a motor vehicle braking device at the wheel of the motor vehicle and the proximal end mechanically coupled to a mechanical brake system structure of the motor vehicle. The system includes a hydraulic cylinder inserted into or at an end of each of the brake rods, to translate motion of the mechanical brake system structure to hydraulic force that then moves the distal portion of the brake rod located between the cylinder and the braking device, and a hydraulic fluid distribution system fluidly interconnecting all of the cylinders.

The motor vehicle may have front brakes and rear brakes, and the hydraulic cylinders for the front brakes may have larger bores than the hydraulic cylinders for the rear brakes. The hydraulic fluid distribution system may be common among all of the cylinders. The hydraulic fluid distribution system may comprise an open four-way fitting and four fluid lines, one connected between the fitting and each hydraulic cylinder. The vehicle braking system may have two bell cranks that are moved by pressing a brake pedal of the motor vehicle, and the hydraulic cylinders may be inserted proximate the bell cranks.

Also featured in a more specific example herein is a hydraulic-based system for mechanically-braked motor vehicles of the type that have front brakes and rear brakes and that move brake rods with two ends, the distal end mechanically coupled to a brake drum at the wheel of the motor vehicle and the proximal end mechanically coupled to a bell crank of the motor vehicle that is moved via the vehicle's brake pedal. The system includes a hydraulic cylinder inserted into each of the brake rods proximate the bell crank, to translate motion of the bell crank to hydraulic force that then moves the distal portion of the brake rod located between the cylinder and the brake drum, wherein the hydraulic cylinders for the front brakes have larger bores than the hydraulic cylinders for the rear brakes. There is a common hydraulic fluid distribution system fluidly interconnecting all of the cylinders, wherein the hydraulic fluid distribution system comprises an open four-way fitting and four fluid lines, one connected between the fitting and each hydraulic cylinder.

DETAILED DESCRIPTION

Figure 1:
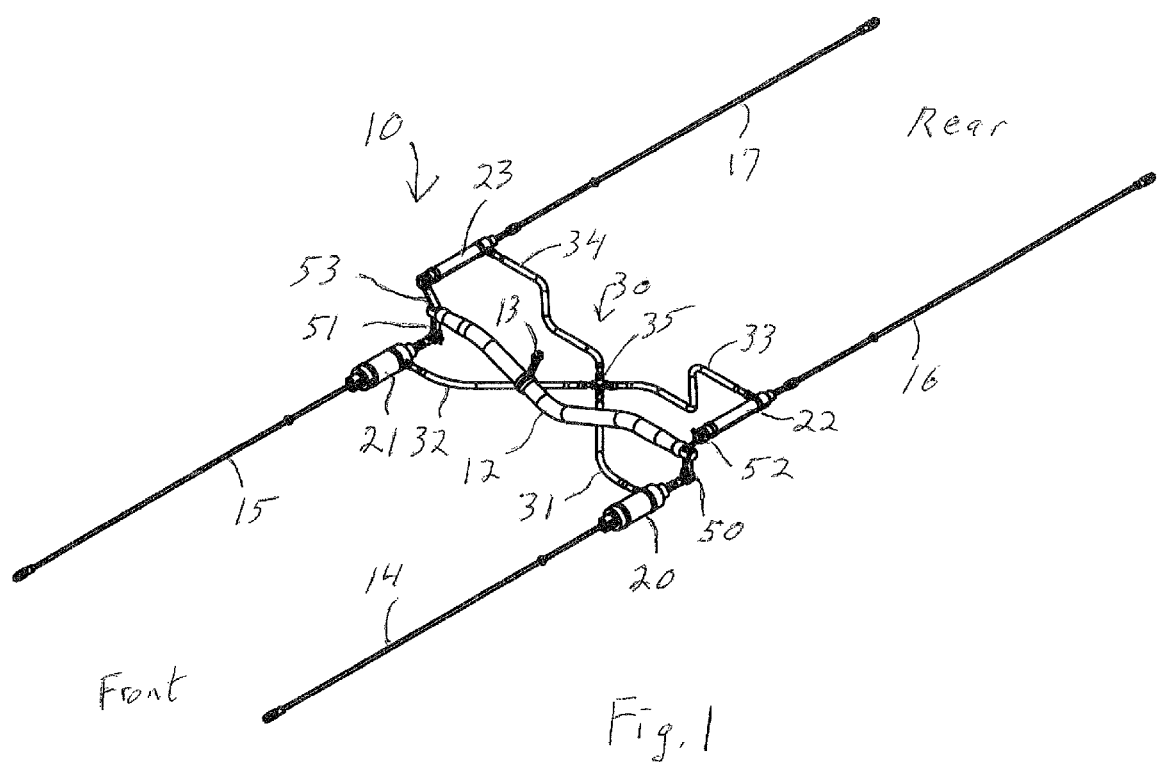
FIG. 1 is a perspective view of a hydraulic brake system for a mechanically braked motor vehicle, which is constructed and arranged to be coupled to the brake actuation system of a Model A Ford automobile.
Figure 2A:
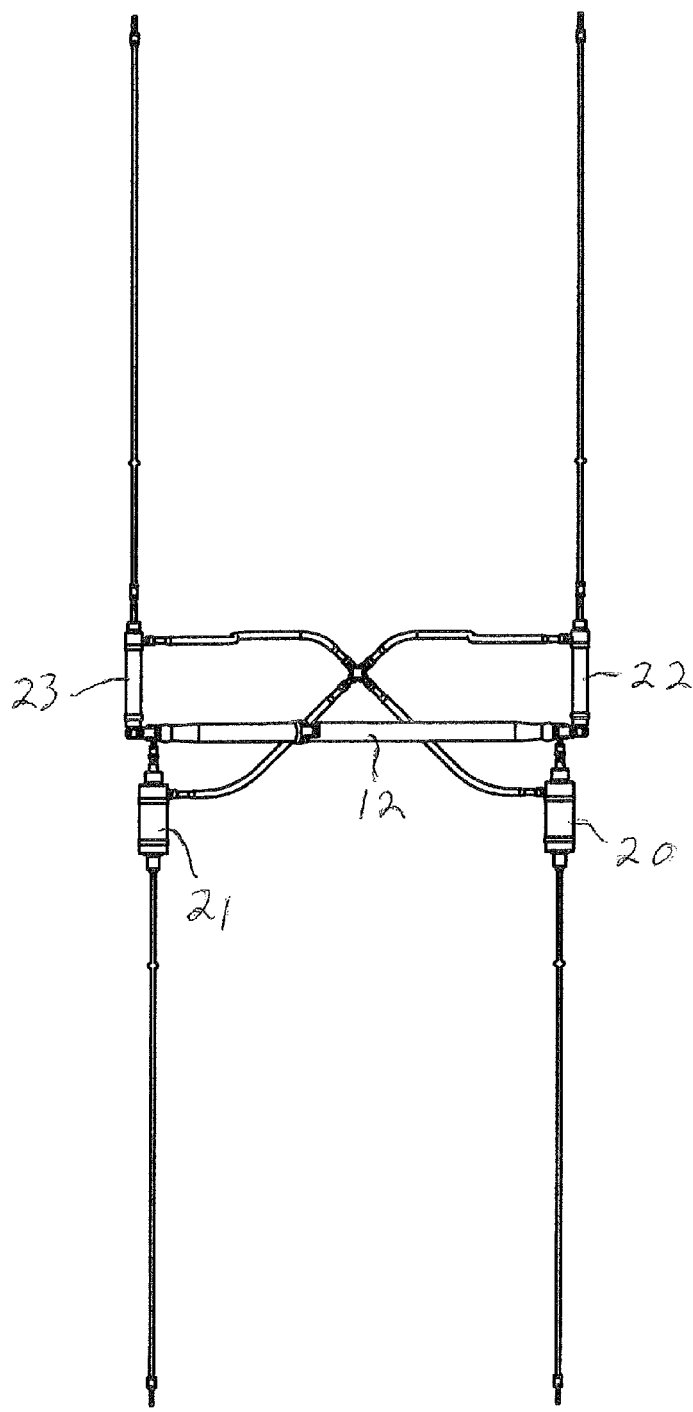
FIGS. 2A and 2B are top and front views, respectively, of the system of FIG. 1.
Figure 2B:
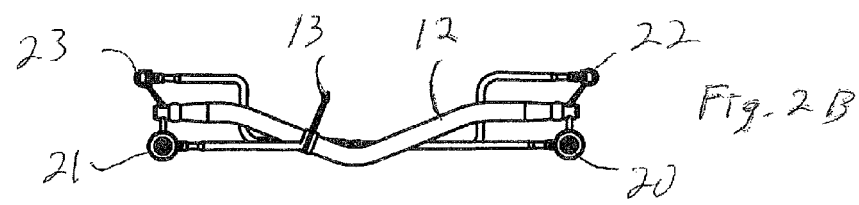

This disclosure features a system that converts mechanical braking systems of automobiles to hydraulically operated systems. The result is more effective, safer and more efficient braking of the automobile. The system may be accomplished with a hydraulic-based system that is used with mechanically braked motor vehicles of the type that move brake rods via bell cranks or other mechanical means. The subject system comprises a hydraulic cylinder inserted into each of the brake rods. In the preferred embodiment, the cylinders are located between each of the bell cranks or other mechanical means for operating the brake rod, and the brake rod (which has been shortened to accommodate the length of the cylinder). The cylinders each translate motion of the bell crank or other mechanical means to hydraulic force that then moves the portion of the brake rod located between the cylinder and the brake drum. The subject system also includes a hydraulic fluid distribution system fluidly interconnecting all of the cylinders. The hydraulic fluid distribution system can be common to all of the cylinders, in which case there is no master cylinder in the braking system. The hydraulic fluid distribution system, once charged with conventional brake fluid, is permanently sealed; if the system looses fluid it is best to replace it rather than attempting to refill it. In one embodiment the front cylinders have larger bores than the rear cylinders, in order to accomplish greater braking force at the front wheels.

The example shown in the several drawings was developed for a 1928-1931 Model A Ford automobile. However, the system can be adapted for use with other mechanically braked automobiles by changing certain details of the preferred embodiment to fit the requirements of the particular automobile.

Hydraulic brake system 10 for a mechanically braked motor vehicle comprises fluidly interconnected hydraulic actuators inserted into each brake rod, and operated by the bell cranks that are part of the Model A braking system. A hydraulic distribution system fluidly interconnects the four cylinders such that the subject system 10 operates without a master cylinder. As a result, when the operator presses the brake pedal an even, regulated force is coupled to each brake rod. The interconnected fluid distribution system balances the force at each brake drum.

One non-limiting example of the subject system is shown in the drawings. System 10 comprises hydraulic cylinders 20-23 for the left and right front and left and right rear wheels, respectively. Existing brake rods 14-17 (appropriately shortened so as to accommodate the cylinders within the existing space devoted to the braking system) are coupled to the output ends of cylinders 20-23, respectively. Thus, the cylinders are actually inserted into each of the brake rods. The cylinders are actuated by existing bell cranks 50-53 (and the existing clevis coupling of the bell cranks to the brake rods), respectively. Bell cranks 50-53 are moved when the operator presses the brake pedal (not shown) that is connected to coupling 13 of shaft 12. Hydraulic fluid distribution system 30 comprises central open, four-way fitting 35, and four lines 31-34 that lead to cylinders 20-23, respectively. Because the hydraulic system is open among the cylinders, the forces are balanced.

In the preferred embodiment, additional braking force is provided to the front wheels via the use of larger bore cylinders 20 and 21 as compared to the bore of cylinders 22 and 23 for the rear wheels. The particular bore and stroke of the cylinders are engineered for universal application on high center of gravity motor vehicles according to modern automotive engineering criteria.

The subject system can be adapted for use with other automobiles by mounting the four hydraulically connected cylinders in the brake rods such that they translate mechanical force to hydraulic force, which is then applied through the brake rods to the existing brake drums. The hydraulic cylinders can be mounted in-line in the brake rods, or they can be mounted at or close to either end of the brake rods; the aim is to have the mechanical braking system structure of the motor vehicle (e.g., the bell cranks or other structures that are moved when the brake pedal is pressed) actuate the cylinders and to have the outputs of the cylinders mechanically coupled to the motor vehicle's braking devices at the wheels (e.g., drum brakes). Appropriate fluid interconnection among the four hydraulic cylinders is also present in the system. The fluid interconnection is preferably common to all of the cylinders so that the braking force is balanced at all four brake drums. However, the hydraulic system can be designed in other ways. Another option is that the subject system can be applied to only the front wheels, or only the rear wheels, depending on the original brake design and arrangement, and the desired results. However, for automobiles with mechanical brakes on all four wheels, it is best to apply the system to all four wheels.

PARTS LIST FOR PREFERRED EMBODIMENT (For 1928-1931 Model A Ford)

Original specification rear brake rod shortened 9", threaded 5/16, 24×1" at the front end. Length from front to brake-spring retaining boss, 23". Length from brake spring retaining boss to rear rod end, 18". Total rod length, 41". Rear end of rod retains original clevis eye to Ford specifications.
5/16, 24×1" coupling nut.
Bimba, H-091-DUZ, 500 psi hydraulic cylinder, universal mount, 1 1/16" bore, 1" stroke
5/16, 24×3" crs
Adjustable clevis eye, OEM.
Plug, 3/8×3/4 crs, center punched, 90 degrees, drilled & tapped 5/16, 24.
Elbow 1/8 NPT to 1/8 NPT, male, flared, brass.
1/8×1/8×1/8×1/8 NPT, female, brass.
Nut, 5/16, 24.
1/4×20" steel brake line with flared male 1/8 NPT fittings, both ends.
1/8 NPT male, to female flared 1/8 NPT.
Brake rod clevis eye (OEM specifications) 3"×5/16, 24×1"
Plug, 1/2"×1" crs, center punched, 90 degrees, drilled & tapped 5/16, 24.
Elbow 1/4 NPT to 1/8 NPT, male, flared, brass.
Bimba, H-171-DUZ, 500 psi hydraulic cylinder, universal mount, 1 1/2" bore, 1" stroke
5/16, 24 Helicoil insert.
Original specification front brake rod shortened 9", threaded 5/16, 24×1" at clevis eye end. Length from front to brake-spring retaining boss, 33". Length from brake spring retaining boss to rear rod end, 8 3/4". Total rod length, 41 3/4". Front end of rod threaded as original 5/16, 24×2".

Although aspects of the embodiment are specific for the specific Model A Ford, the invention can be applied to any motor vehicle with mechanical brakes. The specifics of how this would be accomplished, beyond inserting a hydraulic cylinder in-line with the brake rod, would be apparent based on the particular design of the motor vehicle and its braking system.

What is claimed is:

1. A hydraulic based system for mechanically braked motor vehicles of the type that move brake rods with two ends, a distal end mechanically coupled to a motor vehicle braking device at a wheel of the motor vehicle and a proximal end mechanically coupled to a mechanical brake system structure of the motor vehicle, the system comprising:
a hydraulic cylinder inserted into or at an end of each of the brake rods, to translate motion of the mechanical brake system structure to hydraulic force that then moves each distal end of each brake rod located between each cylinder and its corresponding braking device; and
a hydraulic fluid distribution system fluidly interconnecting all of the cylinders.

2. The system of claim 1 where the motor vehicle has front brakes and rear brakes, and wherein the hydraulic cylinders for the front brakes have larger bores than the hydraulic cylinders for the rear brakes.

3. The system of claim 1 wherein the hydraulic fluid distribution system is common among all of the cylinders.

4. The system of claim 3 wherein the hydraulic fluid distribution system comprises an open four-way fitting and four fluid lines connected between the fitting and each hydraulic cylinder.

5. The system of claim 1 wherein the vehicle braking system has two bell cranks that are moved by pressing a brake pedal of the motor vehicle, and wherein the hydraulic cylinders are inserted proximate the bell cranks.

6. An hydraulic based system for mechanically braked motor vehicles of the type that have front brakes and rear brakes and that move brake rods with two ends, a distal end mechanically coupled to a brake drum at a wheel of the motor vehicle and a proximal end mechanically coupled to a bell crank of the motor vehicle that is moved via the vehicle's brake pedal, the system comprising:
a hydraulic cylinder inserted into each of the brake rods proximate the bell crank, to translate motion of the bell crank to hydraulic force that then moves each distal end of each brake rod located between each cylinder and its corresponding brake drum, wherein hydraulic cylinders for the front brakes have larger bores than hydraulic cylinders for the rear brakes; and
a common hydraulic fluid distribution system fluidly interconnecting all of the cylinders, wherein the hydraulic fluid distribution system comprises an open four-way fitting and four fluid lines, one connected between the fitting and each hydraulic cylinder.

* * * * *